United States Patent [19]
Seelbach

[11] 3,879,264
[45] Apr. 22, 1975

[54] OIL RECLAIMER

[75] Inventor: William R. Seelbach, Orchard Park, N.Y.

[73] Assignee: Petroleum Reclaiming Corporation, Buffalo, N.Y.

[22] Filed: Sept. 25, 1972

[21] Appl. No.: 291,790

[52] U.S. Cl. .............. 196/46.1; 210/168; 210/182; 210/184
[51] Int. Cl. ............................................. C10c 1/20
[58] Field of Search .......... 196/46.1; 210/186, 455, 210/474, 445, 447, 450, 453, 168, 182, 184; 23/272.6 R

[56] References Cited
UNITED STATES PATENTS

| | | | |
|---|---|---|---|
| 1,065,821 | 6/1913 | Moldenhauer | 210/335 |
| 2,174,265 | 9/1939 | Holt | 196/46.1 |
| 2,182,585 | 12/1939 | Green | 210/445 |
| 2,626,229 | 1/1953 | Miller | 196/46.1 |
| 3,366,551 | 1/1968 | Kaso | 196/46.1 |

*Primary Examiner*—Jack Sofer
*Assistant Examiner*—Hiram H. Bernstein
*Attorney, Agent, or Firm*—Bean & Bean

[57] ABSTRACT

Apparatus for refining used lubricating oil including separate readily servicable oil heating or reactor and clean oil tanks and an electrical system for automatically controlling the heat purification of oil in the heating tank in association with refining solids, the transfer of heat purified oil and suspended refining solids to the clean oil tank through an associated filter to remove suspended refining solids from the oil and the shutting down of operation of the apparatus upon drying of the filtered solids. A sump pump is employed to continuously withdraw oil and refining solids from adjacent the bottom of the heating tank and to direct same for flow in heat transfer surface, scrubbing relationship relative to the blades of an electrically powered immmersion heater.

2 Claims, 4 Drawing Figures

OIL RECLAIMER

SUMMARY OF THE INVENTION

The present invention generally relates to apparatus for refining used lubricating oil, and more particularly towards improvements in apparatus of the general type disclosed in U.S. Pat. No. 2,626,229, which serves to render such apparatus commercially practicable.

It is a primary object of the present invention to provide an improved lubricating oil refining apparatus featuring separate, readily servicable oil heating and clean oil tanks, and a fully automatic electrical system for controlling the heat purification of oil in the heating tank in association with refining solids, the transfer of the purified oil and suspended solids to the clean oil tank through an associated filter to remove suspended refined solids from the oil and the shutting down of operation of the apparatus upon drying of the filtered solids to a point sufficiently to permit removal of the solids from the apparatus without spillage of oil and/or such solids.

Another feature of the present invention is the utilization of a sump pump to continuously withdraw oil and suspended solids from adjacent the bottom of a heating tank and to direct same for flow in heat transfer, surface scrubbing relationship relative to the blades of an electrically powered immersion heater. By use of the present apparatus, relatively large quantities of oil may be quickly and uniformly treated with a minimum of sludge or fouling products remaining in the heating tank following transfer therefrom of the refined oil.

DRAWINGS

The nature and mode of the present invention will now be more fully described in the following detailed description taken with the accompanying drawings wherein.

DETAILED DESCRIPTION

Figure 1:
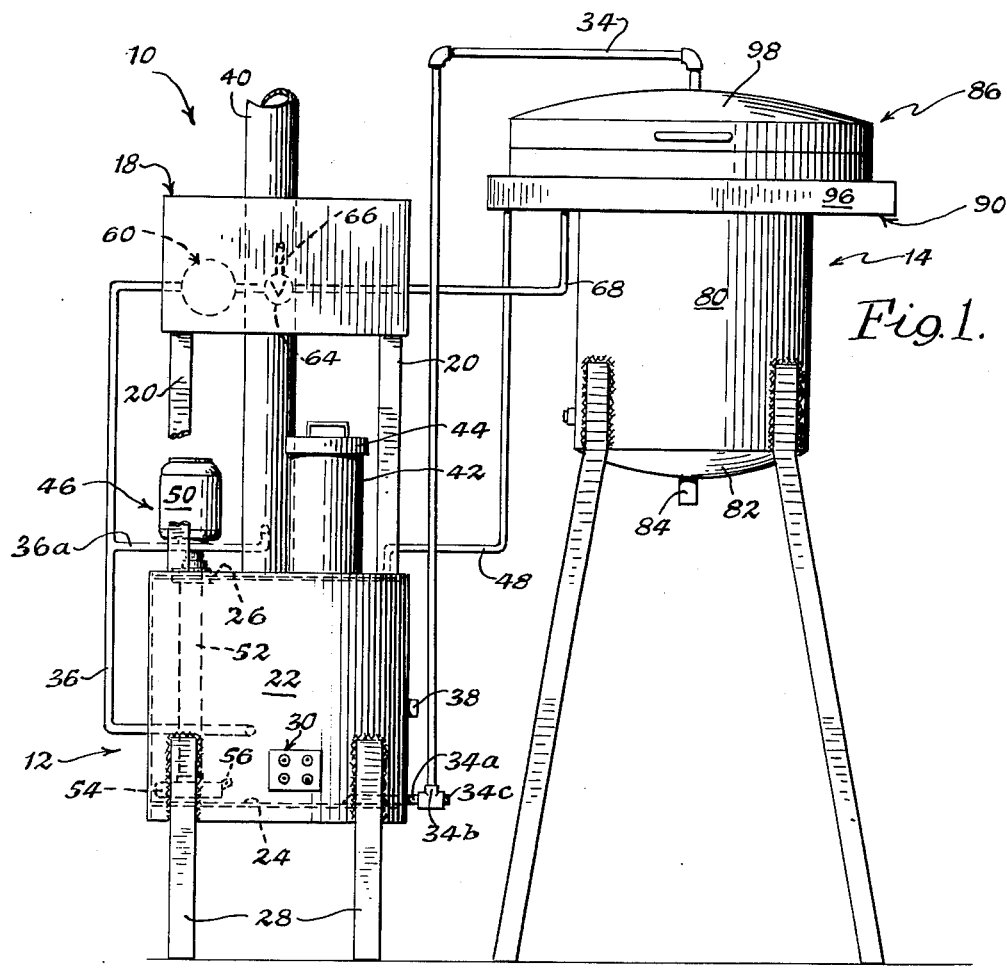
FIG. 1 is a front elevational view of oil refining apparatus according to the present invention.
Figure 2:
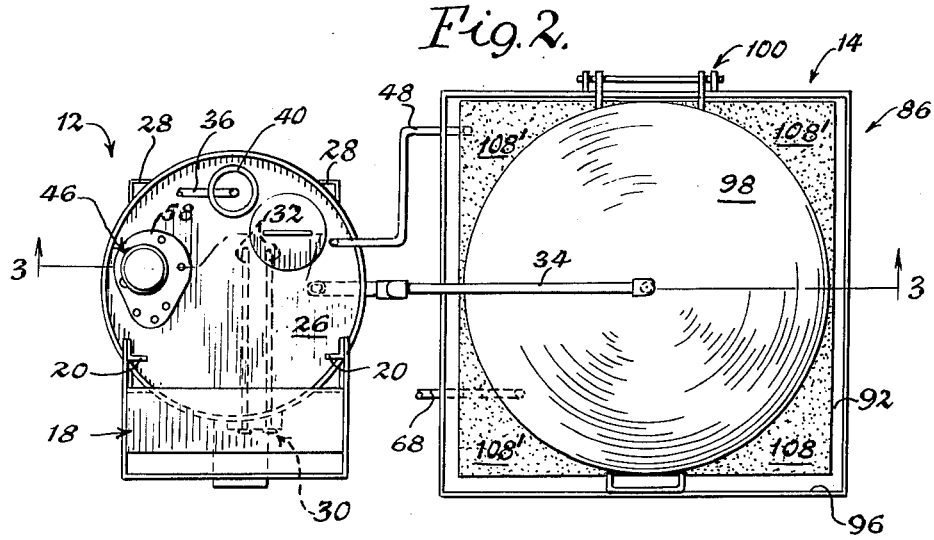
FIG. 2 is a top plan view thereof.

The apparatus of the present invention, which is generally designated as 10 in FIGS. 1 and 2, is particularly adapted for use in refining lubricating oil on a batch basis. Apparatus 10 generally comprises an oil heating or reactor tank 12; a clean oil tank 14; and an electrical control system, which is generally designated as 16 in FIG. 4 and may, as desired, be enclosed within a suitable cabinet 18 supported above tank 12 by posts 20 in the manner illustrated in FIGS. 1 and 2.

Figure 3:
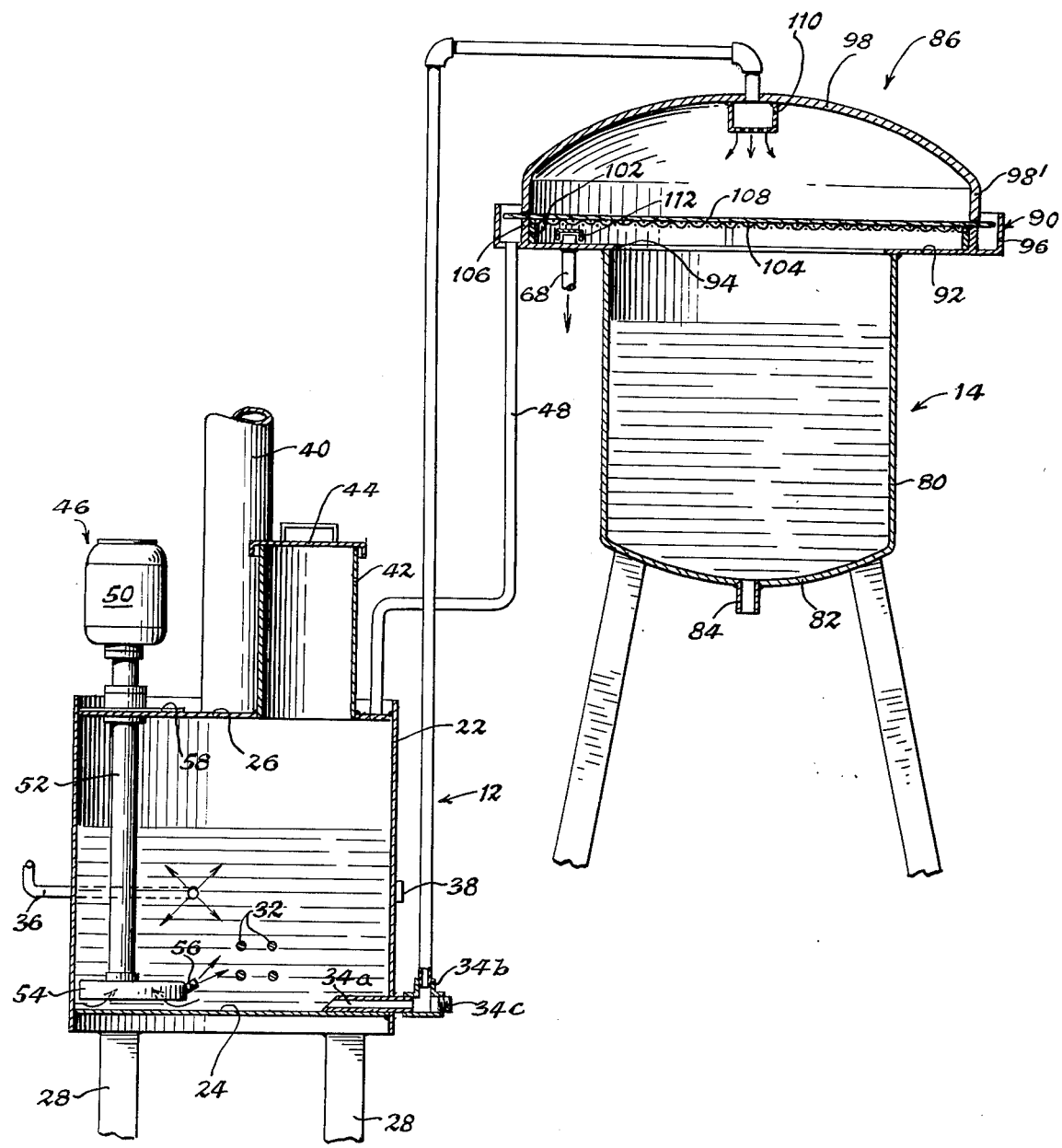
FIG. 3 is a sectional view taken generally along line 3—3 in FIG. 2.

Heating tank 12 is shown in FIGS. 1–3 as having an upstanding cylindrical shell or side wall 22, a bottom wall 24 and a top wall 26; the tank being suitably supported, as by a plurality of legs 28 weld affixed to side wall 22. Heating tank 12 is dimensioned to receive a batch comprising a desired quantity of oil to be refined, such as for instance 30 gallons, and a required quantity of refined solids, such as fuller's earth. While fuller's earth is preferably employed in view of its well known ability to bleach, neutralize acids and absorb impurities and discoloring matter, any other suitable particulate material capable of being filtered from the oil at the completion of the refining operation, may alternatively be employed.

Figure 4:
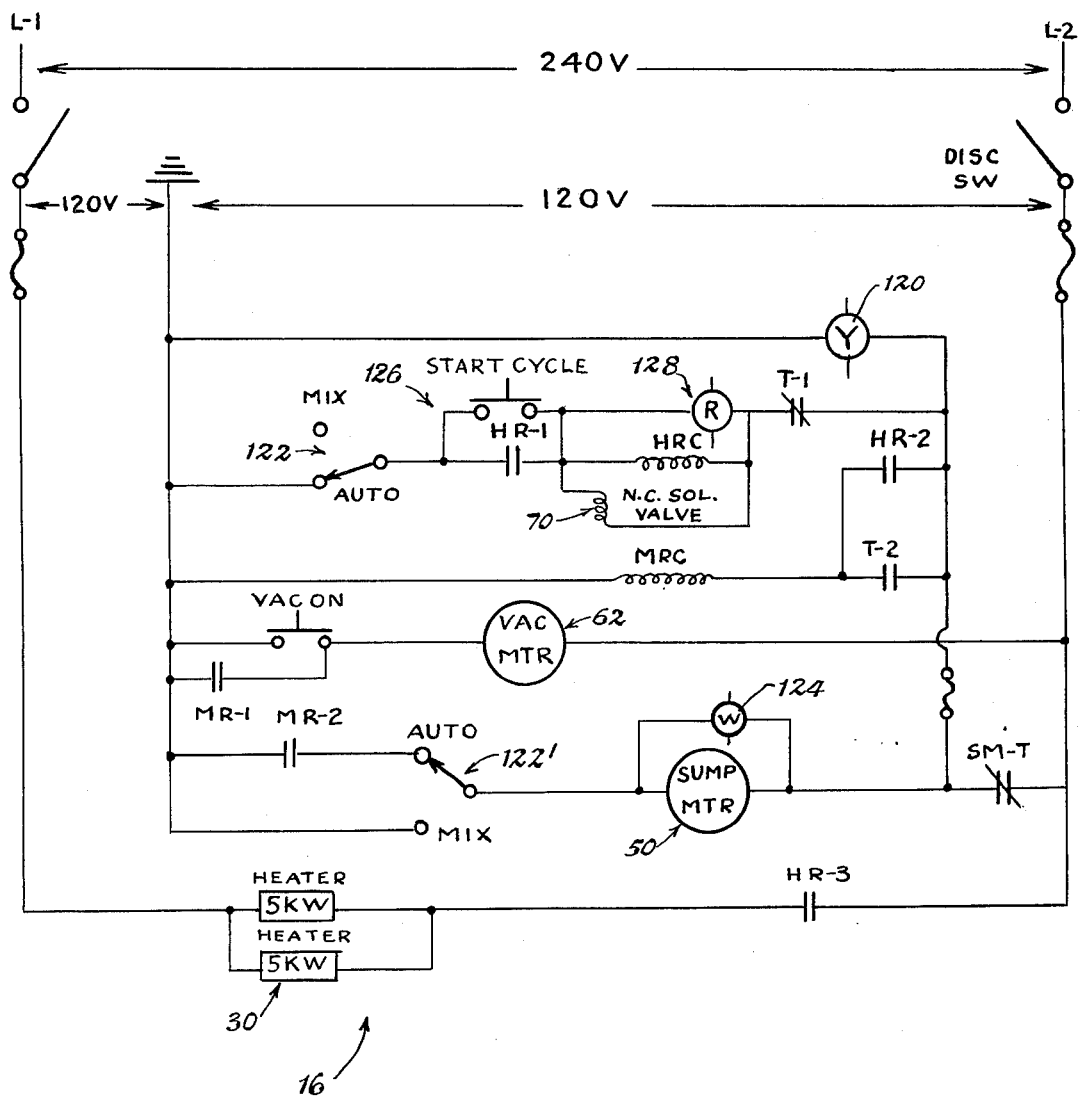
FIG. 4 is a circuit diagram generally illustrating the electrical system of the present invention.

Side wall 22 is apertured to receive an electrically powered immersion heater unit 30 having a plurality of blade elements 32 arranged to extend horizontally within the tank vertically intermediate the upper level of the batch to be processed and bottom wall 24; a transfer conduit 34 for transferring batches from the heating tank to the clean oil tank; an air conduit 36 for introducing compressed air into the batch; and a suitable tank interior temperature sensing device 38 having normally closed contacts "T-1" and normally open contacts "T-2", which are shown only in FIG. 4. Preferably, the inlet end 34a of transfer conduit 34 is arranged to lie immediately adjacent bottom wall 24 in order to insure removal of substantially all of the batch from the heating tank, and a "T" fitting 34b, which is employed to connect inlet end 34a to the main run of conduit 34, is fitted with a removable cap 34c in order to facilitate drainage and cleaning of the heating tank.

Heating tank top wall 26 is apertured to receive a vent pipe 40; a batch charging pipe 42, which is normally closed by cover or lid 44; an immersion pump unit 46; and a return drain conduit 48. Pump unit 46 generally includes a pump motor 50; a shaft housing 52 for enclosing a pump drive shaft, not shown; and a pump housing 54 having a discharge director 56 and enclosing a pump impellar, also not shown. Pump unit 46 is removably supported on top wall 26 by a shaft housing affixed, "one-position" mounting plate 58, such that pump housing 54 is automatically positioned to arrange its downwardly opening inlet slightly above bottom wall 24 and to arrange discharge director 56 so as to direct portions of the batch withdrawn from adjacent the bottom wall upwardly and transversely of blade elements 32 in heat transfer, surface scrubbing relationship therewith. This arrangement is particularly critical to the refining of large quantities of oil, wherein it is necessary to both maintain uniform mixing of the batch constituents and uniform heating thereof.

Pressurized air introduced into the batch through conduit 36 assists pump unit 46 in effecting agitation of the batch, but its primary function is to aid in the forming and removal of undesired vapor constituents of the batch through vent pipe 40. Pressurized air is supplied to conduit 36 by a suitable pump unit, which is generally designated as 60 only in FIG. 1 and includes an electric motor designated as 62 only in FIG. 4. Referring to FIG. 1, it will be understood that the inlet of pump unit 60 is connected to an outlet of a three way solenoid operated valve 64, which has one inlet connected to atmosphere via a conduit 66 and another inlet connected with the interior of clean oil tank 14 via a vacuum conduit 68. Conduit 36 is branched, as at 36a, to provide a supply of pressurized gas through vent pipe 40 with a view to assisting in the withdrawal of fumes from the heating tank.

Now referring to FIGS. 1–3, it will be seen that clean oil tank 14 includes a clean oil storage chamber defined by a cylindrical upstanding side wall 80 and a bottom wall 82 having a drain fitting 84 through which clean oil may be discharged from tank 14 under the control of a suitable valving arrangement, not shown, to a storage tank or device, such as a conventional 55 gallon metal drum, also not shown; and a tank top closure-filter assembly 86. Preferably, tank 14 is supported at an elevation sufficient to permit gravity discharge of clean oil directly to the storage tank, as by legs 88 weld affixed to side wall 80.

Assembly 86 includes an essentially square shallow pan 90 having a bottom wall 92, which is formed with aperture 94 and fixed concentrically of such aperture to the upper marginal edge of side wall 80, and a side flange 96, which upstands from the marginal edges of bottom wall 92; a closure or door 98, which is mounted on pan 90 for vertical swinging movement by hinge device 100; a support ring 102, which is fixed to upstand from bottom wall 92 concentrically of aperture 94 for supporting a disc shaped screen element 104; and a sealing ring 106, which is fixed to ups and from bottom wall 92 concentrically of aperture 94 and intermediate supporting ring 102 and side flange 96. The uppper marginal edge of sealing ring 106 and the upper surface of screen element 104 are essentially coplanar and serve to support an essentially square sheet of filter paper or like material 108; the filter paper being removably clamped in the position illustrated in FIG. 3 between the rim flange 98' of door 98 and the upper marginal edge of the sealing ring. With this construction, closure 98 and screen element 104 may be considered as defining a filtering chamber.

The utilization of a square sheet of filter paper in combination with the above structure greatly facilitates removal and subsequent disposal of used filter paper, due to the presence of "clean" corners 108' disposed outwardly of sealing ring 106, may be readily gripped by a workman and then, if desired, folded upwardly around refining solids collected on the central portion of the sheet. Removal of the filter paper is also assisted by sizing same to provide "finger room" between its marginal edge and side flange 96, and by forming sealing ring 106 of sufficient height to maintain at least a portion of each "clean corner" out of engagement with pan bottom wall 92.

By again referring to FIGS. 2 and 3, it will be seen that transfer conduit 34 is connected into the central portion of door 98 and that a coarse screen or other suitable diffuser device 110 is provided to distribute the entering batch over the upper surface of filter paper 108. Also, it will be seen that vacuum conduit 68 is arranged to open upwardly through pan bottom wall 92 intermediate aperture 94 and support ring 102, and that drain conduit 48 is arranged to open upwardly through the pan bottom wall intermediate sealing ring 106 and pan side flange 96. Preferably, the open end of conduit 68 is partially covered by a suitable shield device 112 in order to prevent oil passing downwardly through screen element 104 from entering the conduit. Of course, conduit 34 would be fitted with a flexible section, not shown, to permit movements of door 98.

The mode of operation of the apparatus of the present invention will now be described with reference to FIG. 4, wherein the electrical system 16 is shown in the condition it exists at the completion of an operating cycle. At this point in time, a yellow light, designated as 120, is energized to indicate to a workman that power is supplied to the system and coupled selector switches 122 and 122' are in their "Automatic" positions.

When the operator desires to initiate an oil refining operation, he places a clean sheet of filter paper over screen element 104, closes door 98 and then switches selector switches 122 and 122' into their "Mix" positions; switch 122' thereby establishing a circuit through pump motor 50 and a white indicator light 124 serving to advise the workmen that pump unit 46 is in operation. A batch of oil and refining solids is then added to the heating tank through charging pipe 42 and cover 44 applied. If pump motor 50 at any time during the operational cycle becomes excessively heated, such as would be due to an overload condition or bearing failure, a normally closed pump motor responsive thermal switch "SM-T" will open and deenergize the entire system.

After a short period during which preliminary mixing of the batch is effected, the operator switches selector switches 122 and 122' into their Automatic positions and then momentarily depresses Start button 126 in order to momentarily establish an operating circuit through coil 70, heater relay coil "HRC", red indicator light 128 and the normally closed contacts T-1 of temperature sensor 34. When coil HRC is energized, it serves to close a holding relay "HR-1" and relays "HR-2" and "HR-3"; relay HR-1 serving to maintain the operating circuit energized after release of the "Start" button. When relay HR-2 is closed, a circuit is established through motor relay coil "MRC", which in turn serves to close motor relays "MR-1" and "MR-2". The closing of relay MR-1 establishes a circuit through pump motor 62, whereas the closing of relay MR-2 serves to re-establish the circuit through motor 50 and white light 124, which was momentarily interrupted by the switching of selector switch 122' into its Automatic position. With the closing of relay HR-3, immersion heater unit 30 is energized and heating of the batch is initiated. With coil 70 energized, valve 64 is maintained in a condition wherein conduit 60 is blocked and ambient air is supplied to the pump unit 60 and directed by conduit 36 into the heating tank 12 for purposes of agitating and aerating the batch, and by branch conduit 36a into vent pipe 40 in order to assist the exhaust of gases fromed as a result of heating the batch.

The refining operation continues uninterrupted until the temperature of the batch and thus the oil being refined reaches the range of between about 425° and 435°F, at which time normally closed contacts T-1 open and normally open contacts T-2 close. When contacts T-1 open, the operating circuit through relay coil HRC, coil 70 and red light 128 is interrupted with the result that relays HR-1, HR-2 and HR-3 open. When coil 70 is deenergized, valve 64 returns to a condition wherein conduit 66 is blocked and the inlet of pump 60 placed in communication with the interior of the clean oil tank 14 via conduit 68 to establish a vacuum therewithin and subsequently draw the batch from the heating tank through conduit 34 and into the clean oil tank. The fuller's earth, together with impurities absorbed thereby are retained as a cake on the upper surface of filter paper, while the refined oil freely passes downwardly through the filter paper and screen element 104 for collection. The opening of relay HR-3 deenergizes heater unit 30, but the opening of relay HR-2 does not serve to deenergize motor relay coil MRC, since contacts T-2 close before relay HR-2 opens. Thus, motors 50 and 62 remain energized as tank 12 cools.

When the temperature within heating tank 12 falls to some predetermined value, contacts T-1 return to closed condition and contacts T-2 open. When contacts T-2 open, the circuit through motor relay coil MRC is interrupted with the result that motor relay MR-1 opens to interrupt the circuit through motor 62 and motor relay MR-2 opens to interrupt the circuit through motor 50 and white light 124. The system is thus returned to its initial or standby condition awaiting replacement of the filter and introduction of a new batch. The tank temperature at which contacts T-2 open is chosen to insure operation of the motor 62 for a period of time after the completion of transfer of the charge, whihc is sufficient to effect drying of the filter cake collected on filter paper by air cycled by pump 60 through conduit 36, tank 12, conduit 34, the filter cake and conduit 68. Drying of the filter cake facilitates removal of the filter paper without drippage of oil or loss of refining solids. However, accidentally spilled refining solids will be retained in pan 90 by side flange 96 and may be subsequently flushed through conduit 48 downwardly into heating tank 12.

I claim:

1. An apparatus for refining used lubricating oil comprising in combination:

a heating tank having an opening through a wall thereof for receiving a batch including a charge of used oil to be refined and a charge of oil refining solids;

an electrically powered immersion heater unit including a plurality of blade heating elements supported to extend inwardly through a wall of said heating tank for heating said batch whereby to effect heat purification of said used oil;

a first immersion pump means including a pump housing defining an inlet and an outlet;

a mounting plate fixed to a top wall of said heating tank for removably suspending said pump housing within said heating tank to position said inlet in a downwardly facing relationship closely adjacent a bottom wall of said heating tank and to position said outlet to direct portions of said batch, removed from adjacent said bottom wall through said inlet, upwardly within said heating tank for flow transversely of and in heat exchange surface scrubbing relationship with said blade elements;

a clean oil storage tank including a filtering chamber enclosing filter means arranged above a clean oil storage chamber, said clean oil tank comprising a. an upwardly open tank portion defining said clean oil storage chamber;

b. an essentially square shallow pan having a bottom wall formed with a central aperture and a side flange upstanding from marginal edges of said pan bottom wall, said tank portion being fixed to and extending vertically below said pan bottom wall in concentrically disposed flow communication with said central aperture;

c. a support ring extending from an upper surface of said pan bottom wall concentrically outwardly of said central aperture;

d. a sealing ring upstanding from an upper surface of said pan bottom wall vertically above said support ring and in engagement with the radially outer surface thereof;

e. a disc shaped screen element supported by said support ring inwardly of said sealing ring;

f. an essentially square sheet of filter paper removably supported on said screen element and extending horizontally outwardly of said sealing ring into proximity with said pan side flange; and g. a closure hingedly secured to said pan adjacent one marginal edge thereof for vertical swinging movement between closed and open positions, said closure having an annular sealing flange arranged to cooperate with said sealing ring to clampingly secure said sheet of filter paper therebetween, said closure and said screen element cooperating to define said filtering chamber;

a transfer conduit having an inlet end communicating with the bottom of said heating tank and having an outlet end communicating with said filtering chamber through a central portion of said closure;

second pump means disposed exteriorly of said heating and storage tanks; and a control system operable in succession to energize said first pump means and said heater unit to effect circulation of said batch and heat purification of said used oil within said heating tank and to thereafter selectively connect said second pump means to said clean oil storage chamber whereby to establish a vacuum therewithin for transferring said batch from said heating tank through said transfer conduit into said filtering chamber and for transferring clean oil from said filtering chamber through said filter paper and said screen element into said clean oil storage chamber, while said refining solids of said batch transferred to said filtering chamber are collected on said filter paper as a cake, said control system including temperature sensing means responsive to a predetermined high temperature within said heating tank at which heat refining of said used oil is completed for deenergizing said heater unit to permit initiation of cooling of said heating tank and to connect said second pump means to said clean oil storage chamber, said temperature sensing means being responsive to reduction of temperature within said heating tank to a predetermined low temperature for deenergizing said first pump means and for disconnecting said second pump means from said clean oil storage chamber, said second pump means having an outlet thereof connected into said heating tank whereby to establish a continuous flow path, when said second pump means is connected to said clean oil storage chamber, successively through said second pump means, said heating tank, said transfer conduit, said filtering chamber, said cake, said filter paper, said screen element and said clean oil storage chamber, and said low temperature being correlated with the period of time said second pump means is connected to said clean oil storage chamber to insure drying of said cake by gas passing along said path.

2. An apparatus according to claim 1, wherein said second pump means is connected into said pan bottom wall intermediate said central aperture and said support ring, said clean oil tank is elevated vertically relative to said heating tank, a drain opening is arranged in said pan bottom wall intermediate said sealing ring and said side flange, and a drain conduit is fitted into said drain opening and extends downwardly into said heating tank.

* * * * *